United States Patent
Xu

(10) Patent No.: US 7,310,432 B2
(45) Date of Patent: Dec. 18, 2007

(54) PORTED SYSTEM FOR PERSONAL IDENTITY VERIFICATION

(75) Inventor: Xiaoshu Xu, Santa Clarita, CA (US)

(73) Assignee: ArtiNNet Corp., Alexandria, VA (US)

( * ) Notice: Subject to any disclaimer, the term of this patent is extended or adjusted under 35 U.S.C. 154(b) by 713 days.

(21) Appl. No.: 10/877,018

(22) Filed: Jun. 26, 2004

(65) Prior Publication Data

US 2005/0286761 A1    Dec. 29, 2005

(51) Int. Cl.
    *G06K 9/62*   (2006.01)
    *G06K 9/00*   (2006.01)

(52) U.S. Cl. ............ 382/115; 382/116; 382/117; 382/118; 382/124

(58) Field of Classification Search .......... 382/125, 382/155–161, 115–124
See application file for complete search history.

(56) References Cited

U.S. PATENT DOCUMENTS

| | | | |
|---|---|---|---|
| 4,582,985 A | 4/1986 | Lofberg | |
| 5,053,608 A | 10/1991 | Senanayake | |
| 5,465,308 A | 11/1995 | Hutcheson | |
| 5,623,552 A | 4/1997 | Lane | |
| 5,825,907 A | 10/1998 | Russo | |
| 6,089,451 A | 7/2000 | Krause | |
| 6,185,316 B1 | 2/2001 | Buffam | |
| 6,241,288 B1 | 6/2001 | Bergenek | |
| 6,356,649 B2 | 3/2002 | Harkless | |
| 6,496,595 B1 * | 12/2002 | Puchek et al. | 382/124 |
| 6,547,130 B1 | 4/2003 | Shen | |
| 6,636,620 B1 | 10/2003 | Hoshino | |
| 6,681,034 B1 | 1/2004 | Russo | |
| 6,807,291 B1 * | 10/2004 | Tumey et al. | 382/124 |

* cited by examiner

*Primary Examiner*—Samir Ahmed
*Assistant Examiner*—Ehsan D. Mafi
(74) *Attorney, Agent, or Firm*—M.A. Ervin & Associates; Michael A. Ervin

(57) ABSTRACT

A biometric based system with advanced security and privacy characteristics for the verification of a person's identity using neural net engine simulation software code and neural net weights obtained from a computer enrollment system and ported into any electronic device with an embedded microprocessor and memory. The neural net structure has both inter and intra layer connections of all nodes.

16 Claims, 4 Drawing Sheets

PORTED SYSTEM FOR PERSONAL IDENTITY VERIFICATION

TECHNICAL FIELD

The invention relates generally to implementations of verifications of biometric information on individuals that can be applied to a variety of devices that have embedded microprocessors. These include at least various ID cards with microprocessors, computers, cellular phones, keyless wireless entry systems, personal digital assistants, and the like.

BACKGROUND

Biometric security has grown in importance and includes many technical approaches. Biometrics refers to authentication techniques that rely on measurable physiological and individual characteristics that can be verified. Biometric systems will play a critical role in the future of security and privacy. Biometric technology is usually based on one or more of the following unique identifiers: 1) fingerprint, 2) voice, 3) face, 4) handprint, 5) iris, 6) retina, 7) signature, 8) DNA, or 9) brainwave. Depending on the context a biometric system can be either a verification (authentication) or an identification system. Verification (am I who I claim to be?) involves confirming or denying a person's claimed identity. Identification (who am I?) is focused on establishing a person's identity. Biometrics can potentially be used to prevent unauthorized access to ATMs, cellular phones, smart cards, desktop PCs, workstations, and computer networks. It can be used during transactions conducted by telephone or Internet, including electronic commerce and electronic banking. Biometrics is playing a crucial role in military security. Biometrics can also replace keys with keyless wireless entry devices for motor vehicles or buildings.

Fingerprint authentication devices have been in use for a number of years. Typically, fingerprint authentication devices use a fingerprint sensor that detects ridges, gaps, and contours within the interstices in the fine lines of a human fingerprint. Generally, this data is conditioned by a computational processing unit that removes random data signals (noise) caused by variations in detection devices and the substrates and filaments that come in contact with a finger. Then a computational process analyzes the resulting data to extract a series of discrete "biometric" features found to be common to most fingerprint data by one researcher or another and found in the data resulting after noise removal. The combination of these discrete biometric features with their attendant qualities and quantities can describe a specific fingerprint. Further, a database may store a series of such biometric readings for multiple individuals. Thus, an individual claiming to be a certain person can place a finger on a fingerprint sensor and a computer can match the biometric data calculated from the person's fingerprint with the biometric data from the claimed identity in the database. A variant of this approach would involve an unknown person who makes no claim to a specific identity. The biometric data from such a person could be compared to a general database of such data for all persons to find a match or a matching group of identities with the same biometric data.

The other serious issue regarding the use of biometric technology is the privacy issue. The extent to which biometrics threaten (or enhance) privacy depends on the use to which they are put. Some uses appear to have the potential for greater privacy threats or enhancements to privacy than others. The actual level of the threat or enhancement will vary according on the particular context. Use of biometrics for authentication may have a low level of privacy risk provided that the authentication system involves the individual knowingly exercising a choice to enroll in a system and the system does not require the authenticating body to hold large amounts of information about an individual except that necessary to establish that the person is who they claim to be. The effectiveness and efficiency of current biometric uses depends on computer technology and electronic devices. This means that most of the privacy risks associated with computer technology also apply to biometric systems. Systems that involve storage of data on, and processing and transmission using, computer technology are subject to hacking and unauthorized access, use and disclosure.

Biometrics has the potential to work as a privacy enhancing technology or a privacy intrusive technology. The impact of the technology depends on, but is not limited to, how it is designed, deployed, collected, stored, managed, and used. Critical factors are whether privacy is built in from early design stages and the extent of choice, openness and accountability. The interaction of privacy and biometrics and potential impacts on privacy through the collection and use of biometric information may include or depend on: the extent of personal information collected and stored in the context of a biometric application; the extent of choice for people about whether to provide biometric information; the fact that biometrics are a powerful identification tool but also can go powerfully wrong; and potential for greater and possibly covert collection of very sensitive information in the course of ordinary transactions. Potential impacts of biometrics and privacy and how they may apply to biometric applications both in the public and private sectors raises considerations such as: bodily privacy in the collection of biometrics; openness and choice in the collection of biometrics; anonymity; potential for data linkage and function creep; and potential for biometric information to act as a universal unique identifier.

All of these considerations have a relevant bearing on how to think about biometrics. Another perspective is that at the same time as the use of biometrics may pose a threat to privacy; there are many possible benefits to individuals, including the possibility of better protection from identity theft and the convenience of not having to remember multiple PINs or passwords. The present invention addresses the earlier mentioned technical challenges while actually enhancing privacy.

A long felt need in the marketplace has been to make biometric authentication technology portable enough to use in applications such as ISO-compliant financial cards, ID cards, or keyless wireless entry devices, all of which tend to be small and/or very thin. The main problems with conventional fingerprint as well as other biometric authentication devices in these type of applications is that the systems are simply too complex in terms of cost, size, energy requirements, and computational power to fit into such a small working space. Relative to such devices the biometric sensors and their accompanying verification algorithms tend to require too much computational complexity, be too large, require too much battery power, and are too expensive. Further, to detect an adequate depth and quantity of characteristics from a fingerprint for reduction to a set of biometrics, the resolution must be relatively dense, requiring high-resolution fingerprint sensors. Both the foregoing are expensive solutions, since costly fingerprint sensors must exist at each place a person's biometric data is to be authenticated, and the act of authentication requires a relatively powerful processing capability to calculate the biometric data. This is essentially a relatively non-portable solution, as the authentication can occur only where there exists adequate processing capabilities and access to an existing and reliable dataset against which to challenge the candidate fingerprint biometrics.

Traditional biometric approaches also have raised security issues in that there is potential for extracting conventional biometric information off of a card to obtain a user's fingerprint information. There is clearly a need for a verification approach that cannot be broken down to yield fingerprint information about the user.

In co-pending U.S. patent application Ser. No. 10/784,556 of this author the need for a highly accurate, secure method that is not computationally intensive and can thus be embedded on an ISO compliant financial card or the like was addressed by a system for personal identity verification that includes at least a computer based enrollment system for training a neural net to obtain neural net weights for a biometric of a user; a carrier, at least one biometric sensor mounted on the carrier, and neural net engine circuitry mounted on said carrier and having stored neural net weights obtained from the computer based enrollment system for the user. The resulting solution allows the development of applications such as ISO-compliant financial cards, ID cards, or keyless wireless entry devices that only require a small, low power neural net chip and enough memory to store the relevant neural net weights associated with a desired biometric.

For systems in which there is not an embedded neural net engine circuitry already included in a carrier such as a circuit board, but there is an embedded microprocessor with memory, there is still a need for a highly efficient and totally secure system for biometric validation. The conceptual framework of co-pending U.S. patent application Ser. No. 10/784,556 is used herein to define a second instant invention to address this need.

What is needed is then an approach that is completely secure, that verifies fingerprints to high accuracy, but does so with a limited amount of software code that can be rapidly transferred into the memory of electronic devices such as personal digital assistants, personal computers, cellular phones, and the like. The instant invention accomplishes that in a novel way. In this patent application such devices will be referred to as electronic devices with microprocessors and internal memory.

SUMMARY

These and other needs are addressed by the present invention. The electronic device with microprocessor and memory could be, but is not limited to a personal, laptop, or desktop computer, a cellular telephone, a personal digital assistant, a keyless wireless entry device, or any electronic device used to access another piece of equipment or to gain access to a location. The achievement of making the actual biometric authentication process into a small, fast, low power, and accurate implementation is accomplished by doing the enrollment process off line one time in a controlled manner by using the biometric information of the user in combination with a representative database of other similar biometrics of many users to train a neural net. Upon completion of that training the only information transmitted to the electronic device is the set of neural net weights and a very compact block of software code that emulates a neural net. The combination of a unique set of neural net weights corresponding to one user's biometric and a small block of generic software code completes the information needed for verification. When the user activates the verification process by, for example, pressing the appropriate finger on a fingerprint sensor or speaking a pre-identified phrase into a microphone used as a sensor, the data from the validation sensor are transmitted directly to the ported software code which rapidly processes the data to give a yes or no answer based on the previously developed neural net weights of the user's fingerprint information. The neural net engine software simulation code is straightforward code that emulates the proscribed neural net with a simple set of multiplications and additions and calculates a single output number that is indicative of a binary answer—whether there is a match or not. There is no complex algorithm to execute; therefore even a small microprocessor can be used. There is no biometric template stored on the card as with conventional biometrics. No information regarding the biometric of the user is in the microprocessor other than the neural net weights. Those weights are unreadable by external means and even if read could not be used to reconstruct the fingerprint so there is no privacy issue as with conventional biometrics. This invention requires less biometric sensor resolution than existing implementations of biometric authentication because the entire available biometric input is resolved to neural net weights which contain a great deal of data. Typical implementation of biometric authentication distills large amounts of data into discrete, arbitrary mathematical constructs called "biometrics", and a great deal of information is discarded in that process. To keep the required neural net small while still powerful the neural nets used in this invention have both inter and intra layer connections on all nodes, which will be explained in the detailed description.

One aspect of the instant inventions is then a system for personal identity verification that includes at least a computer based enrollment system for training a neural net to obtain neural net weights for a biometric of a user, the neural net having both inter and intra layer connections of all nodes; an electronic device containing a microprocessor with internal memory; a validation biometric sensor for capturing a biometric reading from the user, connected to the electronic device; and neural net engine simulation software code ported into the internal memory of the electronic device along with the neural net weights for a biometric of a user from the computer based enrollment system.

Another aspect of the instant invention is a method for personal identity verification including at least the steps of; sensing enrollment information related to a biometric of a user that is recorded by an enrollment sensor; transferring the enrollment information to a computer; combining the enrollment information with samples from a representative database of biometrics from other individuals to form a training set; using the training set and a computer algorithm in the computer to train a pre-chosen neural net structure to preferentially select the biometric of a user and in so doing calculating a chosen set of neural net weights, wherein the neural net is composed of both inter and intra layer connections; transferring neural net engine simulation software code into the internal memory of an electronic device along with the neural net weights for a biometric of a user from the computer based enrollment system, sensing validation information relative to a biometric of a user that is recorded by a biometric validation sensor attached to the electronic device; transferring the validation information to the neural net engine simulation software code to calculate a verification value for the output node; and producing an acceptance signal when the value generated by the output node is within a pre-determined acceptance range.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
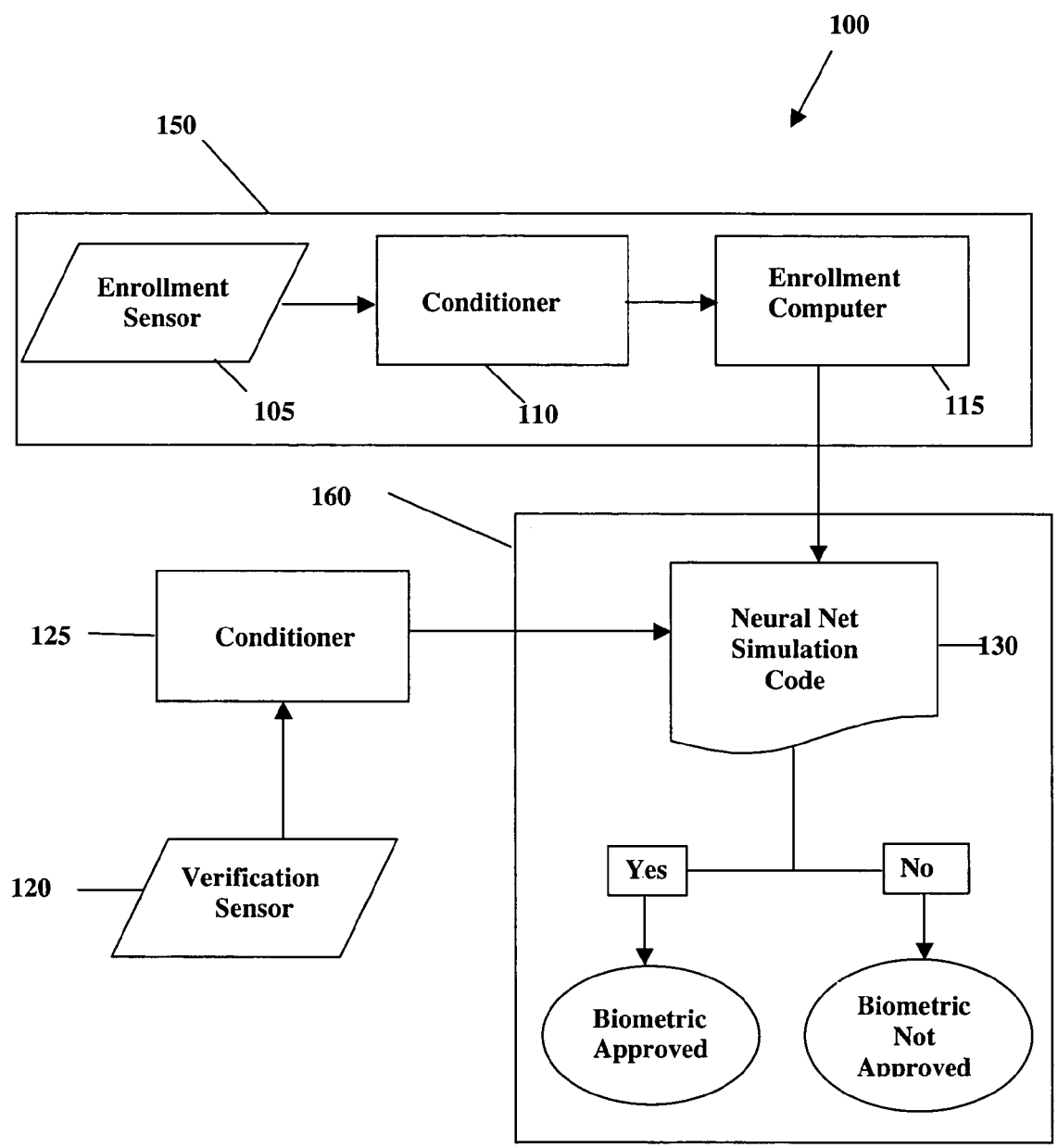
FIG. 1 is a diagram of the components and a flow chart of the present invention making a biometric lock for a single user.

FIG. 1 is a representation of the overall process using the instant invention, represented generally by the numeral 100. Process block 105 represents a commercially available biometric sensor that could be for example a fingerprint sensor, a microphone, or a camera, and is referred to as the enrollment sensor. When a biometric is fed to enrollment sensor 105 a data stream from the enrollment sensor is sent to block 110, which digitizes the data stream and passes it to block 115. Block 115 is a computer, which could be setting next to the sensor in block 105 or be in a remote location. Computer 115 contains software especially designed for the training of neural nets. Also contained in computer 115 is a representative collection of biometric templates that could be fingerprints, voice phrases, or images. The training of a neural net is performed by sampling 5 to 10 samples from the sensor and combining those with a sample set from the biometrics templates to create a training set that is used to train the neural net. The net is trained so it generates a significantly different output from the sensed biometrics from block 105 than the output it generates from the representative biometric database. When the training is complete the set of neural net weights become the data that will be eventually ported into the memory of the electronic device 160.

Block 120, the validation sensor, is a sensor identical to the one used as enrollment sensor 105. It is connected to a conditioner 125, which transmits the information to the previously ported software code 130 that simulates the exact same neural net trained in the enrollment process.

It is important to note that module 160 can represent any number of devices as long as they have even a modest microprocessor with memory. Conventional biometric validation algorithms require fairly powerful microprocessors and enough memory to store a large set of biometrics. Testing has shown that the ported neural net simulation code of the instant invention is less than 200 lines of code, requiring less than 4K of memory. This can be compared to conventional biometric algorithms requiring several thousand lines of code.

Module 150 comprising blocks 105, 110, and 115 together represents an enrollment process or system. Module 150 could be located in close proximity to module 160 during the enrollment process or be in a remote location with communication via telephone or Internet.

The enrollment sensor 105 and validation sensor 120 will depend on the biometric being measured. They could for example be fingerprint sensors, microphones for voice authentication, or cameras or digital scanners for iris or retina authentication. In the fingerprint case the sensors tend to be thin structures of touch sensitive material. These are often sensor matrices that create a digitized image of a fingerprint placed in contact with its surface. There are many such products on the market and can be area (matrix) sensors or a swipe sensors. This invention anticipates the use of any of them. In the preferred mode both enrollment sensor 105 and validation sensor 120 will be of identical design. A preferred sensor is the BLP-60 fingerprint sensor manufactured by BMF Corporation.

Computer 115 is a standard computing device consisting of a central processor with memory and a storage device containing algorithms to train a neural net and thereby compute neural net weights. The computer also can access a database of representative biometric templates. The storage devices contain a pre-defined neural net structural design created by a neural net algorithm. The aforementioned algorithms and structures are those that can be designed and built by one skilled in the art of designing and using neural networks. The storage devices may also contain program instructions to execute back or forward propagation or custom designed neural net training algorithms to calculate weights. The weights, and data describing the nodes to which they are assigned, are ported to electron device 160 along with the pre-coded neural net simulation code. The weights and the software code can be transmitted via a direct wire or fiber-optic cable or indirectly through a network, like the Internet, or a local area network. They can also be transmitted either wirelessly or through wires via telephone networks.

Computer 115 could for example be a desktop computer at a bank used to enroll users but it could also be a central server that receives data from enrollment sensor 105 via phone lines or Internet connection. Another approach could be for intermediate transfer devices such as for example a laptop computer that could download neural net weights from multiple enrollment sessions and then be moved around to field install the neural net weights and neural net software code into field modules of module 160 of FIG. 1. The instant invention anticipates any of these possibilities. The neural net simulation code 130 is based on the identical neural net structure as the one used in generating the neural net weights from computer 115. Conditioners are simple computational processing units with instruction sets for digitizing data signals. There are many of these types of conditioners on the market and the invention anticipates the use of any of them.

The neural net software simulation code 130 receives the weights and node assignments and stores them in the memory of electronic device 160. When the above step is completed, the neural net software simulation code is ready to be used. A user submits the requested biometric via the validation sensor that is in communication to the neural net software simulation code 130. The validation sensor then outputs a stream of modulated data carrying information about the biometric characteristics. This data is modulated further by the conditioner and passes the result to the neural net software simulation code via a direct wire or fiber-optic cable or indirectly through a network, like the Internet, or a local area network, or through a wired or wireless telephone system. The neural net software simulation code 130 processes the data and calculates a yes or no validation of the biometric. The neural net software simulation code 130 outputs a value indicating whether or not the biometric fed to validation sensor 120 is a close match to the biometric originally fed to enrollment sensor 105.

It is important to understand that in use the verification step of the neural net does not involve analyzing a biometric template obtained from validation sensor 120. No biometric templates are prepared or stored as in much of the prior art. The data from validation sensor 120 is transmitted to the neural net structure of neural net software simulation code 130, which generates a yes or no answer using the neural net weights previously downloaded from programmable computer 115. The logic algorithm built into neural net software simulation code 130 is a set of multiplications and additions with no conditional branching and little intermediate memory storage. This aspect of the instant invention provides a low cost, small size solution that can fit within the specifications of all known electronic devices with microprocessors and memory. These benefits would apply to any biometrics such as those obtained from microphones or cameras and thus could be voice, iris, retina, face, or hand print data.

A particular strength of the instant invention is that the computationally intense step in biometric authentication has now been moved completely to the enrollment process, and the enrollment process is normally only done once or at most a few times. The actual verification step, which will ordinarily be done many times, has been converted into a parallel processing computation that can be carried out without a complex microprocessor or large memory required. In this way the initially stated goal of finding a small, low cost, portable verification solution is achieved.

Figure 2:
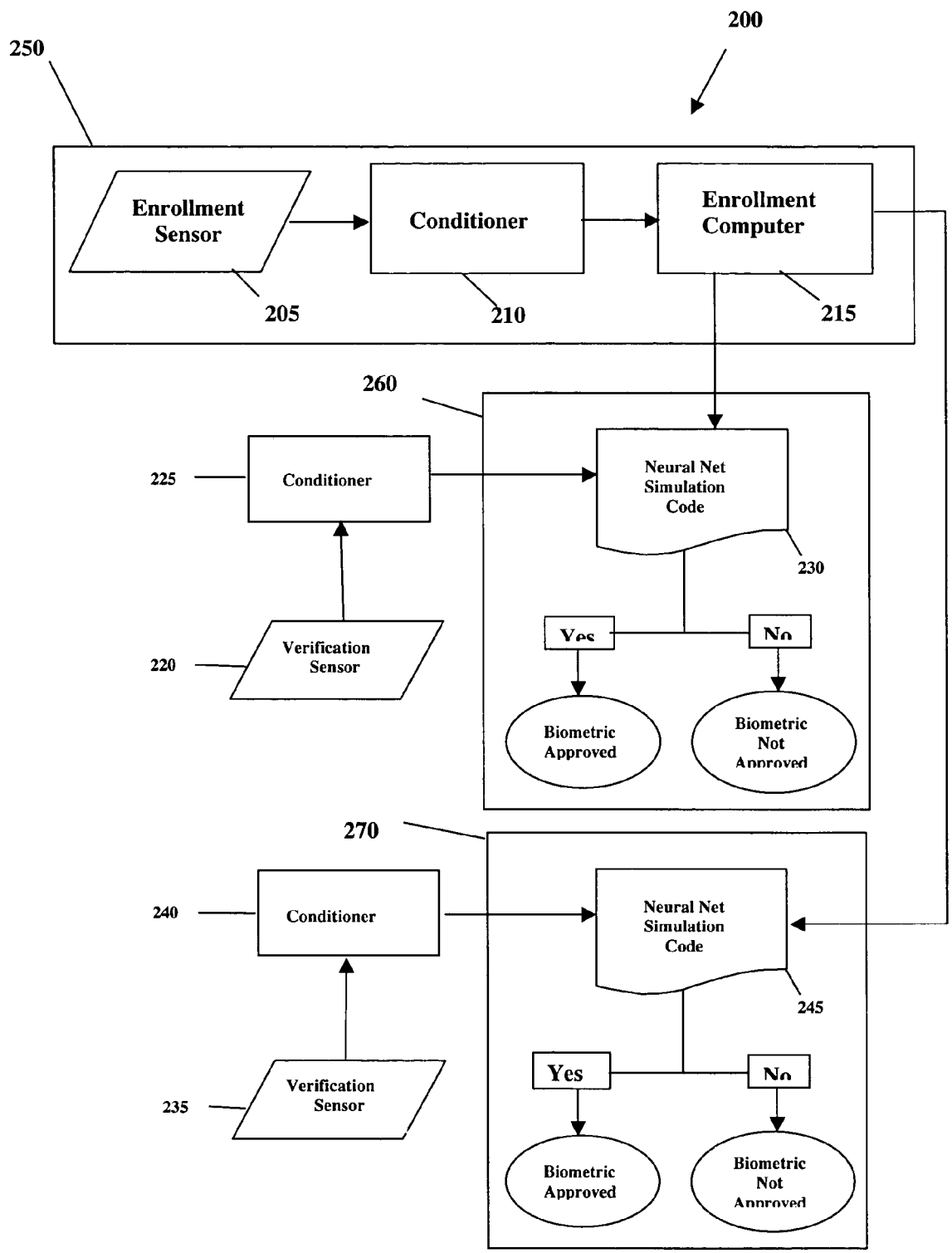
FIG. 2 is a diagram of the components and a flow chart of the present invention for multiple biometrics.

The low cost, small size aspect of the neural net software simulation code makes it possible to increase security by applying more than one biometric verification to the same device. FIG. 2 shows such a case, shown generally by the numeral 200. Blocks 205, 210, and 215 again make up an enrollment system as described before in FIG. 1. In this case the enrollment process sequence would be used two or more times to create neural net weights for two biometrics. The first set of neural net weights and software code would be ported to 260 and the second set of neural net weights and software code would be ported to 270. Items 260 and 270 could be two different locations in memory in an electronic device or could represent two different electronic devices. In use the user would submit one biometric onto validation sensor 220 and a second biometric onto validation sensor 235. As described previously each of the data flows from validation sensor 220 and validation sensor 235 would be applied directly to the neural nets software simulation code of 230 and 245 respectively to generate verification signals. This arrangement could be two biometric readings from the same person or in special security situations it could be biometrics from two different individuals that might be required. The small size of the block of software code needed would allow any number of combinations of users and devices needed.

The conditioners are small computational processing units with instruction sets to modify the data coming from a sensor to evenly modulate it or remove extraneous noise. There are many structural variations in the marketplace for conditioners of this type, which are sometimes also known as post-processors or pre-processors of data. These may take the form of microprocessors on an integrated circuit or a central processing unit in a computer. This invention is envisioned to be able to use any of them.

An artificial neural network (ANS) is a computer-based architecture, which emulates the human neural system in the brain. It consists of nodes and weighted links that connect the nodes. A completed ANS can contain hundreds of nodes and thousands of links. Each node is a nonlinear transformation. The structure of the net contains input nodes that receive the data from outside of the net. This is akin to the data received in the brain from human sensors, e.g. eyes. The nodes send signals out to succeeding nodes. The nodes that provide the outputs to the user are the output nodes. In between the input and output there can be other nodes that are called hidden nodes. There can be one or more layers of such hidden nodes. The hidden nodes can accept inputs from multiple other nodes. The output nodes identify the nature of the output, e.g. eyes looking at a painting provide an input to the brain, and then the brain concludes or outputs that the received data is from a painting. An ANS can be thought of as multi-dimensional input/output pattern mapping. The signal, or input pattern, from the outside is input into the ANS through the input nodes. Those signals will propagate to the hidden nodes, and finally to the output nodes through the links. The signals will be manipulated by the weight associated with each link and the nonlinear transformation in each node. The output represents the ANS 'conclusion.' ANS has shown to be very successful in many areas such as: pattern recognition, signal processing, non-linear modeling, etc.

The key to constructing an ANS to perform a desired function is to find how many nodes need to be connected together, how many hidden layers should be used and how the connecting links are weighted. There is no method to simply assign those unknowns directly. The approach used by scientists and engineers is called "training" or "learning by trial and error", just as a human does. There are many commonly used training algorithms. The instant invention anticipates the use of a variety of neural net structures and a number of training methods.

Figure 3:
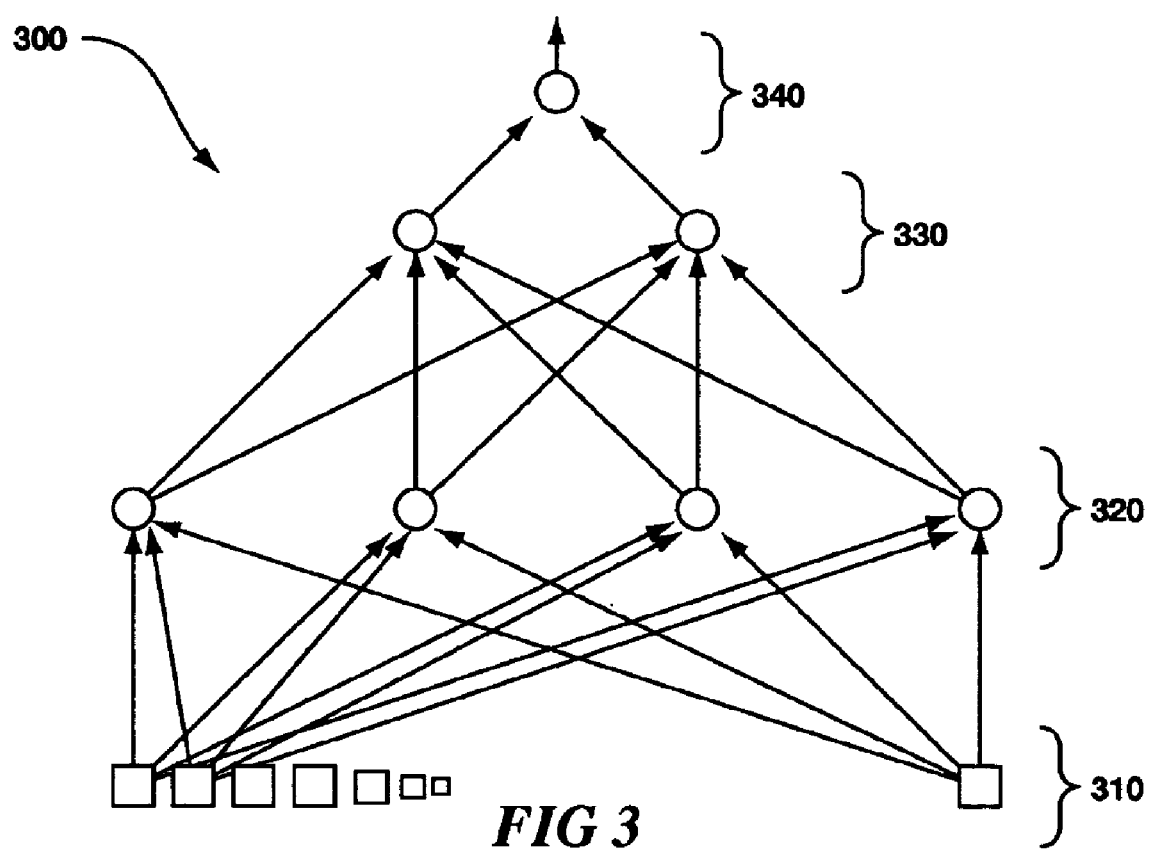
FIG. 3 is a diagram illustrating a possible neural net configuration for representing biometric data.
Figure 4:
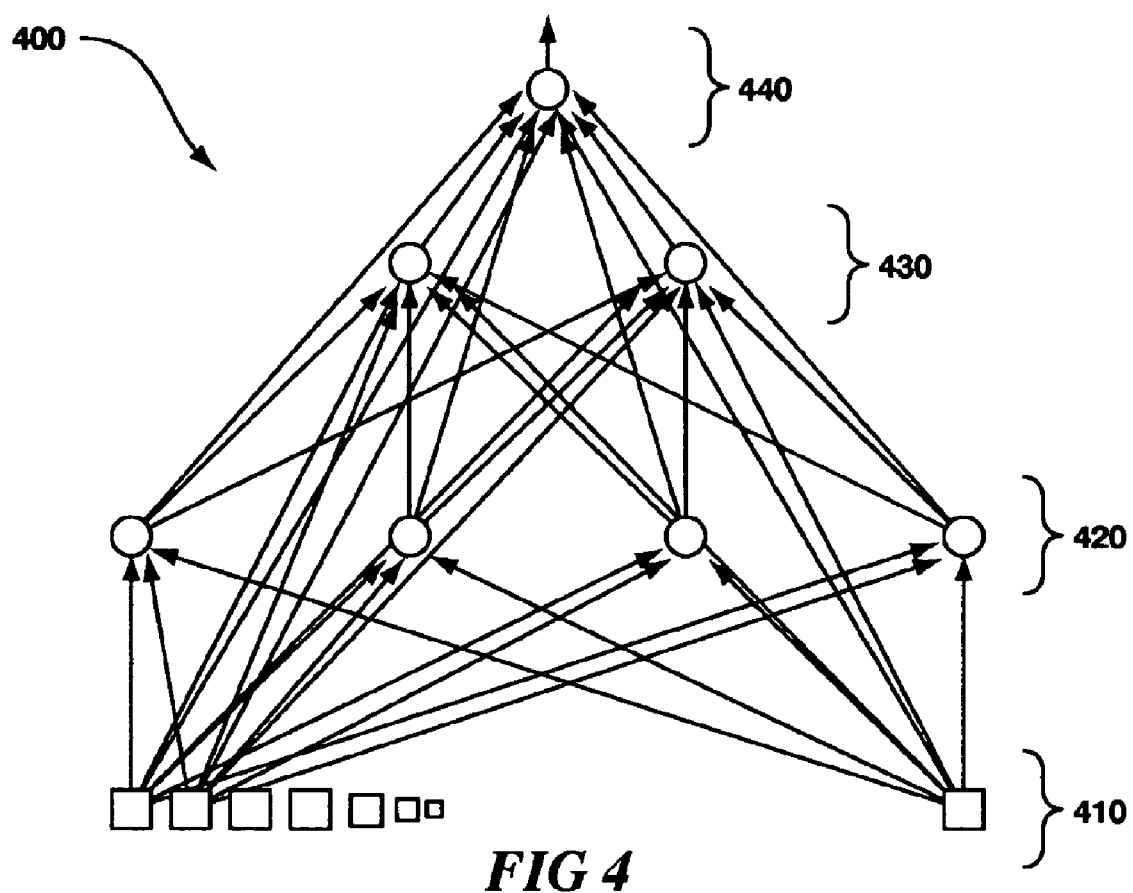
FIG. 4 is a diagram illustrating a second possible neural net configuration for representing biometric data.

In any given neural net structure the number of connections can also vary depending on whether each layer is only connected to its next layer or is connected also to further removed layers. For example in a four layer net the nodes in layer 2 are often connected to the layers in layer 3 but it is possible to increase the complexity of the net by also connecting the nodes in layer 2 to the nodes in layer 4. FIG. 3-4 illustrates this by showing two neural net structures that are identical with respect to the number of nodes but the first (FIG. 3) has only inter-layer connections. In FIG. 3 the neural net is represented generally by the numeral 300. Input layer 310 has 1024 nodes with only a few shown for clarity. The first hidden layer 320 of four nodes is connected to each of the 1024 nodes of input layer 310 and forward connected to the second hidden layer 330. The second hidden layer 330 of 2 nodes is connected to the nodes of hidden layer 320 as well as to output layer 340. The second neural net (FIG. 4) represented generally by the numeral 400 has an identical node structure but has both inter and intra layer connections. For example each node in input layer 410 is connected not only to the nodes in hidden layer 420 but also to the nodes in hidden layer 430 and the single node in output layer 440. The increased interaction between nodes is evident. For purposes of this description and to concisely describe the invention a neural net of the type of FIG. 3 is defined as an inter-layer connected net. A neural net of the type of FIG. 4 is defined as an inter and intra-layer connected net.

Although as mentioned before any number of neural net structures with a differing number of nodes and a differing number of hidden layers could be effectively used for purposes of this invention a preferred embodiment effective for biometric validation is a neural net with 2 hidden layers, less than 17 neurons, and both inter and intra layer connections.

There has thus been outlined, rather broadly, the more important features of the invention in order that the detailed description thereof may be better understood, and in order that the present contribution to the art may be better appreciated.

It should be evident that some combinations of the above ideas could be incorporated into other digital devices such as personal digital assistants (PDA's) or digital cameras that have onboard processors and memory.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for personal identity verification comprising the steps of:
   sensing enrollment information related to a biometric of a user that is recorded by an enrollment sensor;
   transferring said enrollment information to a computer;
   combining said enrollment information with samples from a representative database of biometrics from other individuals to form a training set;
   using said training set and a computer algorithm in said computer to train a pre-chosen neural net structure to preferentially select said biometric of a user and in so doing calculating a chosen set of neural net weights, wherein said neural net is composed of both inter and intra layer connections;
   transferring neural net engine simulation software code into said internal memory of an electronic device along with said neural net weights for a biometric of a user from said computer based enrollment system
   sensing validation information relative to a biometric of a user that is recorded by a biometric validation sensor in communication with said electronic device;
   transferring said validation information to said neural net engine simulation software code to calculate a verification value for the output node; and
   producing an acceptance signal when the value generated by said output node is within a pre-determined acceptance range.

2. The method of personal identity verification of claim 1 wherein said produced acceptance signal activates a visual display.

3. The method of personal identity verification of claim 1 wherein said produced acceptance signal activates an audio speaker.

4. The method of personal identity verification of claim 1 wherein said acceptance signal activates an electrical switch.

5. The method of personal identity verification of claim 1 wherein said acceptance signal activates a wireless transmitter.

6. The method of personal identity verification of claim 1 wherein said electronic device is a cellular telephone.

7. The method of personal identity verification of claim 1 wherein said electronic device is a programmable computer.

8. The method of personal identity verification of claim 1 wherein said electronic device is a digital camera.

9. The method of personal identity verification of claim 1 wherein said electronic device is a microprocessor.

10. The method of personal identity verification of claim 9 wherein said microprocessor is attached to a building entrance.

11. The method of personal identity verification of claim 9 wherein said microprocessor is embedded in a smart card reader.

12. The method of personal identity verification of claim 9 wherein said microprocessor is embedded in a motor vehicle.

13. The method of personal identity verification of claim 1 wherein said validation biometric sensor and said enrollment biometric sensor are fingerprint sensors.

14. The method of personal identity verification of claim 1 wherein said validation biometric sensor and said enrollment biometric sensor are microphones.

15. The method of personal identity verification of claim 1 wherein said validation biometric sensor and said enrollment biometric sensor are cameras.

16. The method of personal identity verification of claim 1 wherein said validation biometric sensor and said enrollment biometric sensor are digital scanners.

* * * * *